United States Patent

[11] 3,630,392

| [72] | Inventors | Bernard G. Cintract<br>Boulogne;<br>Rene G. Sevin, Garges-Les-Gonesse, both of France |
|---|---|---|
| [21] | Appl. No. | 27,939 |
| [22] | Filed | Apr. 13, 1970 |
| [45] | Patented | Dec. 28, 1971 |
| [73] | Assignee | Compagnie Francaise des Petroles<br>Paris, France |
| [32] | Priority | Nov. 12, 1969 |
| [33] | | France |
| [31] | | 6938751 |

[54] ROD STACKING AND HANDLING APPARATUS
14 Claims, 12 Drawing Figs.

[52] U.S. Cl. ..................................................... 214/1 P,
214/2.5, 214/16.4 R
[51] Int. Cl. ..................................................... E21b 19/14
[50] Field of Search ........................................... 214/1,
16.42, 1 P, 2.5, 16 B, 16.4, DIG. 3; 221/76;
211/1.5

[56] References Cited
UNITED STATES PATENTS

| 2,874,859 | 2/1959 | Gahlman | 214/16.4 X |
| 3,158,211 | 11/1964 | McCue et al. | 214/2.5 X |
| 3,168,183 | 2/1965 | Cooper | 214/1 P X |

*Primary Examiner*—Gerald M. Forlenza
*Assistant Examiner*—Frank E. Werner
*Attorney*—Sughrue, Rothwell, Mion, Zinn & Macpeak ABSTRACT: Apparatus for the stacking and withdrawal of horizontal rods, comprising a plurality of horizontally aligned finger bars for supporting the rods in horizontal relation, each of the finger bars having a free end, a conveyor for receiving a rod in the horizontal position and for moving it vertically to a position adjacent the free ends of selected bars and a pair of screw conveyors in horizontal alignment that are movable upwardly for engaging the rod and for moving it laterally onto the selected bars. The conveyors cooperate with spacing combs on the bars which maintain the rods in a predetermined spaced relation on the bars when the conveyors are moved away from the bars.

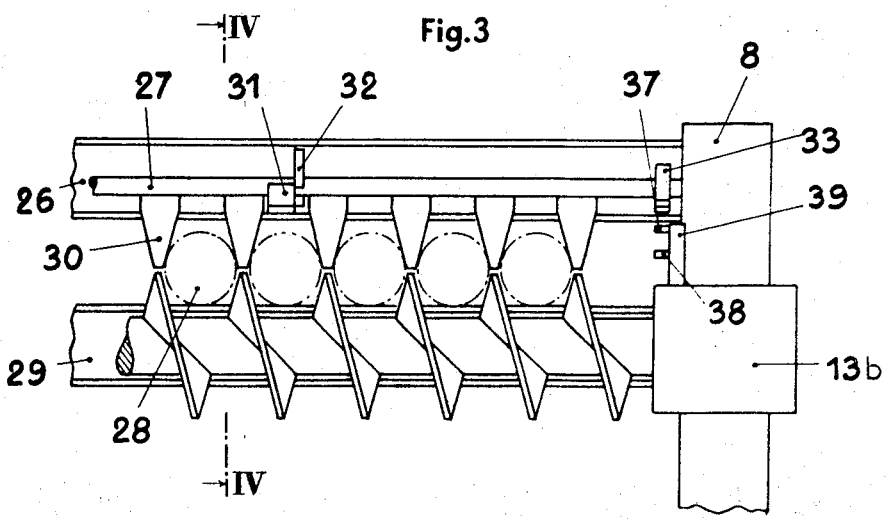
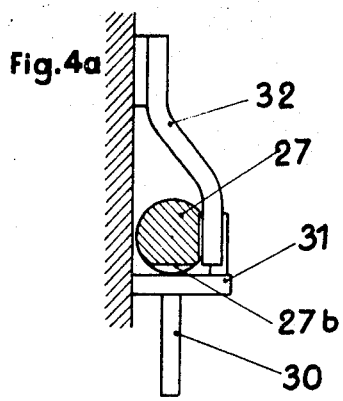
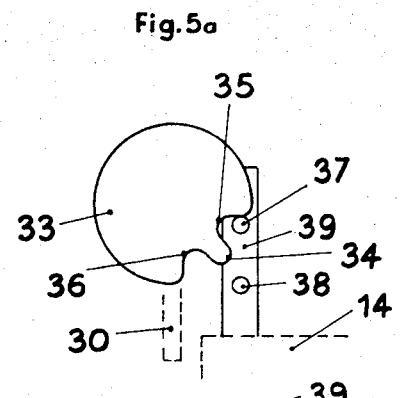
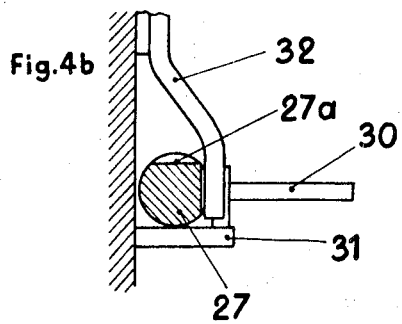
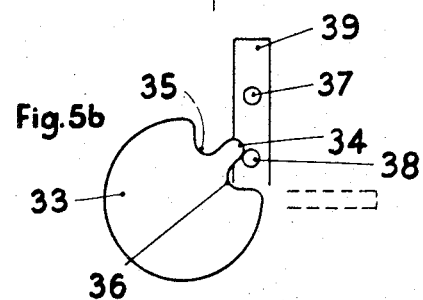

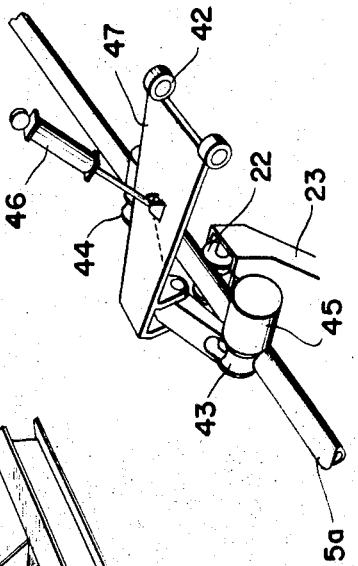
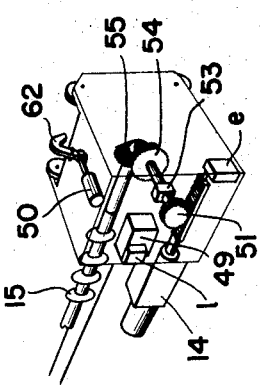
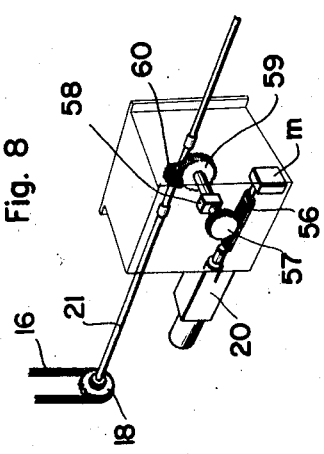
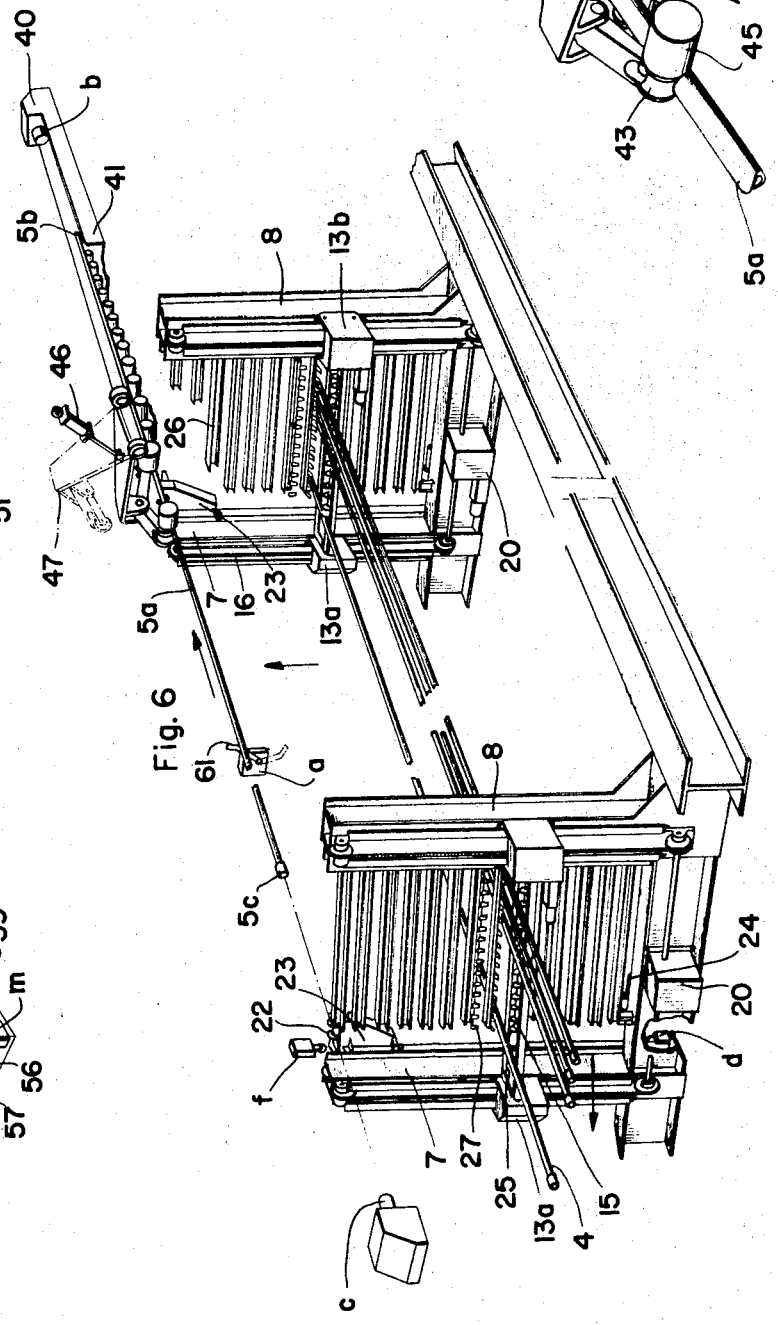

3,630,392

ROD STACKING AND HANDLING APPARATUS

BACKGROUND OF THE INVENTION

This invention relates to a system for the horizontal stacking and handling automatically of rods intended for use in an underwater drilling well.

There are presently in use more or less automated systems permitting the horizontal storing of rods on board a vessel which includes a derrick. This manner of stockpiling is preferred to the vertical line up of rods in the derrick when we deal with ocean installations, not only because of the cumbersomeness of the derrick but also because of the distribution of the weights on board the ship.

One compact and rather inexpensive system for horizontal rod stacking and alignment consists in arranging the rods in columns by causing them to rest directly, one above the other, between vertical posts separating two consecutive columns. The rods can be withdrawn in any column order which offers the advantage of facilitating the storing of rods with different dimensions in different columns. On the other hand, this system entails the inconvenience of requiring the presence of personnel to handle the withdrawal of each rod and to use the rather cumbersome overhead cranes.

On the other hand, entirely automated systems offer the advantage of being fast and they also avoid the use of overhead cranes. In the operation of these automated alignment systems, the rods are supported on a series of horizontal carrying finger-bars lined up vertically, one above the other. These finger-bars in their upper portion define a combined surface for the reception of the rods, and protuberances on their lower portion serve as guides for the rods resting on the line of finger-bars immediately below. When it is desired to introduce rods on a line of finger-bars, after filling the immediately lower horizontal line, we lower the upper finger-bars for the support of the new line of rods, which enables the previously lined-up rods to be maintained in position. We then remove the finger-bars of the adjacent upper line, which will later on serve as guides for the rods to be lined up next. A conveyor belt, featuring a series of teeth spaced in a manner such that two consecutive teeth serve for guidance and for the lateral movement of a rod, is arranged perpendicularly to and above the first upper line of rods. The assembly of rods of this line is then displaced by the conveyor belt so that the rods pass beyond the end of the finger-bars which support them and then fall into an appropriate track, where carrying rollers, supported by levers activated by jacks, pick up each rod in order to move it to a higher level.

Such an arrangement is entirely satisfactorily for the usual drilling systems, that is to say, for drilling systems where the complete automation of each of the operations necessary for the transfer of a rod distributed by the alignment system up to the derrick and its attachment to the set of rods is not provided.

However, when we want to automate these various operations, it becomes necessary radically to eliminate all of the risks of defective presentation of rods and to obtain reliability and consequently total safety in the performance and sequence of rod lineup and distribution operations.

SUMMARY OF THE INVENTION

The main object of this invention consists in a rod lineup and distribution system, in which each rod is supported horizontally by at least two carrying finger-bars, each belonging to a different series of horizontal carrying finger-bars, lined up vertically and spaced equally, each finger-bar of one series having a free end and an end attached to a post, said system being equipped with a means for the reception of a rod in the horizontal position and for the vertical movement of said rod up to the desired level of each group of finger-bars situated in the same horizontal plane and being characterized by the fact that it involves at least two horizontal screw conveyors with an axis perpendicular to said vertical plane of displacement of said means for the vertical movement of rods, as well as means for bringing about the rotation of the conveyors in a synchronized fashion and means for moving the conveyors in a synchronized fashion up to a given level, the length of the screws of the conveyors being greater than that of the finger-bars, such that any rod displaced vertically by said vertical movement means is intercepted by said screws which have the same thread and the same orientation.

The horizontal rod, moved vertically by the rod movement device, is intercepted by two screws having the same thread and the same orientation and it then suffices to make their orientation, in the initial position, such that the displaced rod will fall into the space between the portions of two consecutive helicoidal surfaces of each screw in order, by simple screw rotation, to bring about the horizontal displacement of the rods parallel to the carrying finger-bars. The advantage of such a system is that it can be used for rods with different diameters, the rods penetrating more or less between two portions of helicoidal surfaces, depending upon their diameters. It then becomes possible to prevent any defective alignment of even large-dimensioned rods and to preserve a rigorous parallelism between them in the course of their horizontal movement on the screws of the conveyors, when these screws are being rotated.

Another object of the invention is a rod alignment system in accordance with the previous arrangement, in which each end of each of the shafts of the screw conveyors is mounted in a support, one of the supports sliding vertically on a post situated beyond the free ends of the carrying finger-bars designed for aligning the rods, said support furthermore involving a horizontal small supporting plate on such a level that, when the upper surface of each supporting plate is on the level of the upper surface of the finger-bars selected for alignment, the rod, intercepted by the screws of the conveyors during its descent by means of the vertical rod movement device, will penetrate between two portions of neighboring helicoidal surfaces will engage the small supporting plates.

The advantage of such a mechanism is that it permits the simultaneous horizontal movement of very heavy rods by causing the rods to rest, not on the screws, but on the small plates, and then on the finger-bars, thus avoiding any particularly large forces against the helicoidal surfaces. To control the rotation of the screws of the conveyor, one can therefore use equipment with relatively low power. It is furthermore possible to increase the speed of the vertical rod movement device since the rod transported is intercepted by the small plates serving as thrust-blocks and not by the surface of the screws. Finally, there is provided an easy and effective means for making the rods pass, without any jolts, over the carrying finger-bars since the small plates are of a sufficient size so that each rod, moved along on the small plate, rests on that plate during its horizontal movement until it comes to rest on the ends of the finger-bars which are on the same level.

Another object of the invention is an alignment system in accordance with the previous arrangement, in which the portion of the screws of the horizontal conveyors, situated beyond the vertical plane limiting the free end of the carrying finger-bars, has a thread greater than the thread of the portion of the screws which are opposite the finger-bars.

This arrangement enables us to have sufficient free space for the conduct of one rod on the portions of the screws situated beyond the free ends of the finger-bars, while still conducting one rod on the carrier finger-bars, by the rotation of a single turn of the shaft of the screws of the horizontal conveyors, thus facilitating automation and speed of the operations.

Another object of the invention is an arrangement of the type described above, in which the support of the end of the horizontal conveyors, opposite the support equipped with a small supporting plate, slides vertically on the post supporting the carrier finger-bars, each of the finger-bars—with the exception of the lower finger-bar—involving a comb capable of assuming two stable positions: a horizontal position to assure the free passage of the rods on the immediately lower finger-bars, and a vertical position, to maintain a constant interval between the rods arranged on said finger-bars, each comb having a control member for causing it to pass from one position to the other and each support sliding on said post having a means for the control of said member, so that, during the vertical movement of said support upward, it will tip said control members into the position where the combs are horizontal and where, in the course of its descent, it will move said members along into their initial position where the combs are vertical.

In addition to the simplicity and the compactness of the system, we have absolute operating safety during the transition of a rod alignment or withdrawal operation from one horizontal line to the next. Let us assume, for example, that we have just loaded a series of rods on the carrier finger-bars at a given level and that we want to load the immediately lower line. It is clear that this loading is made possible by the fact that the means for the control of the support of the horizontal conveyor had tipped the member for the control of the comb borne by the immediately higher finger-bar during its rise. After loading, the descent of the conveyor brings about the progressive tipping of the comb since the control means, borne by the support of the conveyor, descends, returning the control member of the comb to its initial position. It results from this that, while the portions of the helicoidal surfaces of the horizontal conveyor progressively leave the interval separating the consecutive rods, the teeth of the comb penetrate progressively into said intervals. In this way we can assure the constant guidance of the rods by giving the system total operating security.

Another object of the invention is an arrangement of this type in which the means for the reception and horizontal movement of the rods involves at least two rollers with horizontal shafts, each having a groove for the reception and guidance of one rod, said grooves being situated in the same vertical plane of displacement of said rollers, between an upper position for loading operations and a lower position for storage, at least one of said rollers cooperating, in its upper position, with the device for the horizontal movement of the rod carried by said rollers until one of the ends of the rod reaches a thrust-block.

The advantage of this arrangement is that the same system of horizontal stacking enables us to assure not only the alignment of rods with different diameters but also the alignment of rods with different lengths. Furthermore, the assembly of pieces in motion is limited to movements of translation and of rotation of one axis around itself, and it then becomes particularly easy to equip such a system with a series of control members and to integrate it eventually within an entirely automated assembly, one of the ends of the rod extracted from the stacking system then being presented—regardless of its dimensions—in a determined position.

BRIEF DESCRIPTION OF THE DRAWINGS

FIG. 3 is an elevation view of a detail of the alignment assembly in FIG. 1;

FIGS. 4a and 4b represent schematic fragmentary views in cross section made along the section IV—IV in FIG. 3, for two different positions of the rod guidance comb;

FIGS. 5a and 5b represent, respectively, the schematic views of the members for controlling of the rotation of the comb, for each of the positions of the comb shown in FIGS. 4a and 4b;

FIG. 6 is a general schematic perspective view of the horizontal rod stacking system;

FIG. 7 is a schematic view, in perspective, of a detail of the device for the advancing of the rods, as shown in FIG. 6;

FIG. 8 is a schematic view of a detail of the motor unit 20 of FIG. 6;

FIG. 9 is a schematic view of the motor unit 13b of FIG. 6; and

DESCRIPTION OF THE PREFERRED EMBODIMENT

Figure 1:
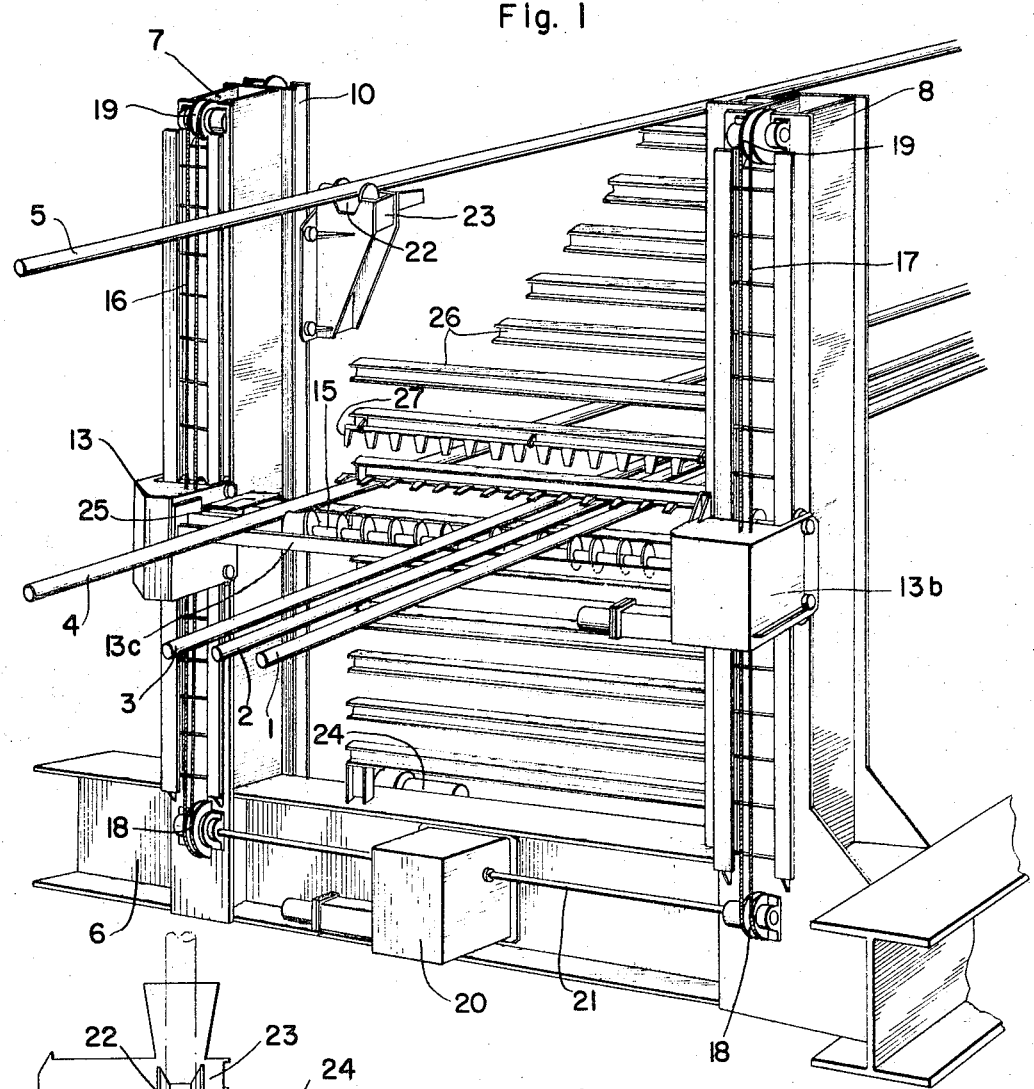
FIG. 1 is a schematic perspective view of one of the alignment assemblies of the horizontal stacking system of the present invention.

In order to facilitate the description of the horizontal rod stacking system, we shall refer, first of all, to FIG. 1, showing one of the assemblies of carrying finger-bars and rod conveyors of which the stacking system is made up. In FIG. 1, and only for the purpose of facilitating the understanding of the drawing, we assume that rods 1-5 were in the course of introduction into the horizontal alignment device and that they were on any of the carrier finger-bars 26.

Although no rods are shown between rods 3 and 4, it is clear that, in practice, there is no reason for leaving free intervals between two consecutive rods in one and the same horizontal row and that all of the upper rows may be assumed to be filled.

Figure 2:
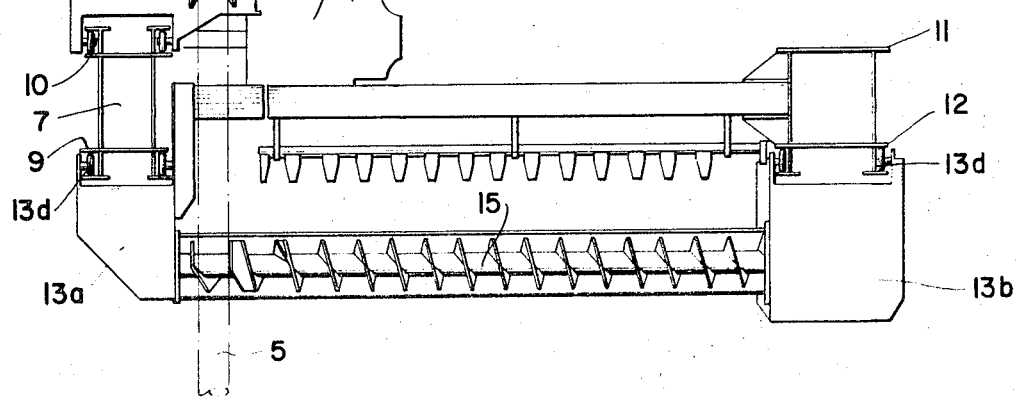
FIG. 2 is a plan view of the alignment assembly shown in FIG. 1, when no rod has as yet been introduced.

It is also to be understood that the rods are supported by means of two assemblies identical to the one shown in FIG. 1. Each of these assemblies essentially involves a U-shaped frame consisting of a horizontal base 6 and two vertical posts 7 and 8. As shown in FIG. 2, the posts 7 and 8 involve wings 9 and 10 for post 7, 11 and 12 for post 8. Two support cases 13a and 13b support a screw conveyor 15 at their ends as well as a central case 13c. They furthermore have roller wheels 13d guided, respectively, by wings 9 and 12 of each post, so as to facilitate the vertical movement of the support cases 13a and 13b along posts 7 and 8. Each case 13a and 13b is attached to the ends of the roller wheel movement chain 16 or 17. The chains 16 and 17 are mounted, respectively, around pulleys 18 and 19, said pulleys being moved along in a synchronized fashion, either in one direction or in the other, by means of an appropriate motor mechanism 20, attached to base 6. The movement is transmitted by means of drive shaft 21 connected to the pulleys 18.

Rod 5 rests on a carrying roller 22, mounted on a support 23, slidable on wing 10 of post 7. The support 23 is moved by a device (not shown) similar to the one which we have just described for the vertical movement of cases 13a and 13b. Its control motor can be of any suitable type and has been shown at 24 on the opposite side of base 6 with respect to the position of motor 20.

When case 23 descends along post 7, rod 5 engages the support plate 25 which prevents it from moving to the bottom of the helicoidal groove of screw 15. The support case 13b involves a motor element which can be of any type whatsoever, capable of bringing about the rotation of screw 15, either in one direction or in the other direction and limiting its movement to just one turn. This type of movement is known in itself and therefore has not been shown here. For example, one can use either a motor equipped with a clutch device for just one turn or a jack such as 14, in FIG. 9, activating a rack engaging with a pinion 52, mounted on the shaft of a movement inversion control mechanism 53. This mechanism, in turn, moves along the conical pinion 54, engaging with pinion 55 which constitutes one piece with the shaft of screw 15. In order not to crowd the drawing, the inversion mechanism, which may be manual or automatic, was not shown in detail since such mechanisms are well known.

Referring now to FIG. 3, which is an elevation view of a detail of the portions of two consecutive carrier finger-bars in the vicinity of post 8 which supports them, we note that only finger-bar 26 carries a mobile comb around shaft 27. We have assumed, in effect, in this figure, that rods 28 rested on the lowest finger-bar 29 of the stacking system. On the other hand, each of the finger-bars above finger-bar 26 has an identical comb for the purpose of maintaining a constant horizontal spacing between the rods in the same horizontal row. For this purpose, each comb has teeth 30 which are lodged between rods 28 and are spaced such that the rods 28 cannot be wedged between two consecutive teeth.

Each of the combs has a shaft 27 capable of turning freely on its supports 31, attached to finger-bar 26, between two extreme positions. These positions are shown, respectively, in FIGS. 4a and 4b wherein we see that shaft 27 has two flat portions 27a and 27b, cooperating with a retaining spring 32. The position of the comb shown in FIG. 3 corresponds to the position shown in FIG. 4a.

Shaft 27, at its end near post 8, has a cam 33 which is visible in FIGS. 3, 5a and 5b. This cam has a tooth 34 between two slots 35 and 36 which cooperate with two stubs 37 and 38 carried by a small bar 39 secured to support case 13b of screw 15. FIG. 5a shows the position of cam 33 when shaft 27 is in the position shown in FIG. 4a, and FIG. 5b shows the position of the cam when the shaft is in the raised position of FIG. 4b.

It then suffices to move, vertically upward, the horizontal screw conveyor consisting of screw 15 and supports 13a and 13b in order to have stub 37, in FIG. 5a, engage in groove 35 and cause cam 33, hence, shaft 27, to rotate in a counter-clockwise direction. The movement continues as shown in FIG. 5b where stub 38 engages the tooth 34. Due to the tension of spring 32, FIG. 4b, the rotation of shaft 27 by a quarter of a turn is accomplished by the application of flat portion 27b against the inside face of the spring.

At this end of the movement, teeth 30 are in the position shown in FIG. 4b, the teeth then being completely disengaged from the rods 28.

The vertical movement of the horizontal conveyor is controlled by the motor mechanism 20, FIG. 1. This movement may be so regulated as to move the conveyor by a distance equal to the interval separating two consecutive carrier finger-bars every time the conveyor is turned on. Therefore, when the conveyor passes from one finger-bar to the next, rods 28, FIG. 3 are constantly guided at the beginning of the movement by teeth 30 which rotate progressively with the rotation of cam 33, FIG. 5, and at the end of the movement by the helicoidal surfaces of screw 15 which penetrate increasingly into the free intervals between the rods. In the intermediate portion of the movement, the rods are kept separated, simultaneously, by the teeth 30 and by the screws 15.

As shown in FIG. 8, motor mechanism 20 may be similar to the one already described for the rotation of screw 15. In particular, motor 20 may be made up of a simple jack whose rod has a rack 56, moving a pinion 57 whose shaft controls a mechanism 58 for transmitting a movement in a direction the same as or opposite to that of pinion 57. Thus, mechanism 58 can move the conical pinion 59 in opposite directions. The chain 16, mounted around pinion 18 of shaft 21, raises or lowers the support cases 13a and 13b on posts 7 and 8, depending upon the direction that pinion 59, engaging with pinion 60, is moved by mechanism 58.

The general and schematic view of FIG. 6 shows a second assembly identical to the one illustrated in FIG. 1. For greater simplicity, similar pieces have been given the same reference numbers but only two combs have been shown, one of them in a vertical position and the other one in a horizontal position with respect to the loading operation.

A longitudinal rod displacement device, such as for the displacement of rod 5a, makes it possible to move the end 5b of the rod on a thrust-block 40 which is at the end of a series of roller wheels 41. This device is illustrated in detail in FIG. 7.

A support 47, tiltable around a shaft 42 is connected to an assembly of two groove wheels 43, 44 at least one of which is a driving wheel. In the version shown, the moving wheels 43, 44 have their shafts secured to motors such as 45. A jack 46 enables the support 57 to be moved downwardly to firmly apply the rollers 43 and 44 against rod 5a, or, on the contrary, to be raised in order to release rod 5a at the end of the movement.

Figure 10:
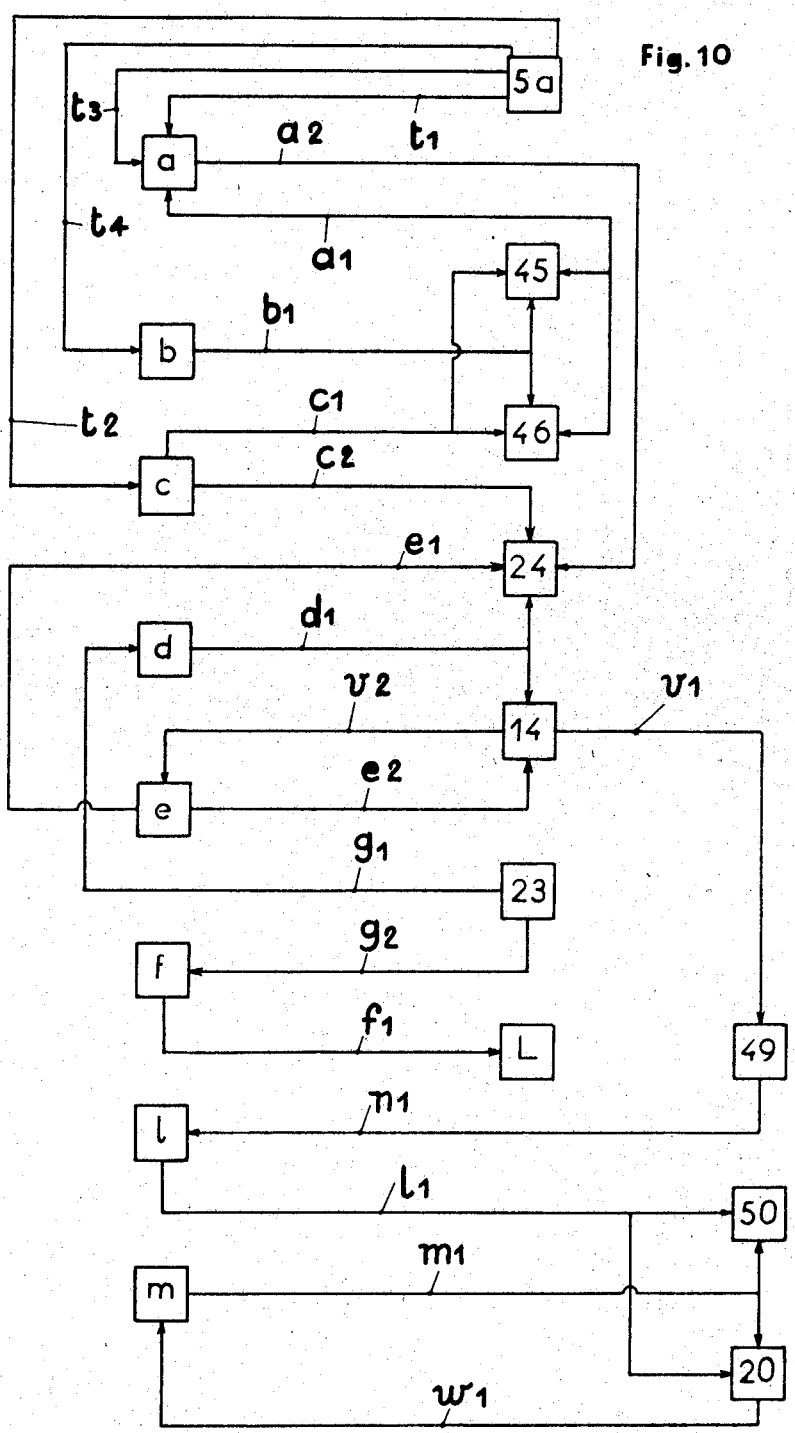
FIG. 10 is a schematic view of the connections of the control members for the displacement of the rods.

To follow the operation of the stacking system, we refer now, on the one hand, to FIG. 6, where we have shown the various system control members, and, on the other hand, to FIG. 10 which shows the electrical or mechanical connections of the members among each other. It is clear, in effect that the connections may be accomplished both by electrical circuits and by hydraulic circuits controlled by valves.

Let us assume that we have to align a rod in the system, with no rod as yet on rollers 22, and that the support 47 of the longitudinal conveyor device is raised. The placement of a rod 5a on rollers 22, brings about the downward tipping of finger-bar (FIG. 6) of contactor "a" when rollers 22 are in their upper position. This position of the finger-bar 61 of the contactor brings about the closing of a first contact—or the opening of a valve—establishing, by wire or circuit $a1$, the control of motor 45 and of jack 46. Jack 46 lowers the assembly 47, bearing driving roller wheels 43 and 44, FIG. 7, and motors 45, moving rod 5a toward the pushbutton contactor "c." The action of rod 5 upon contactor "a" has been shown schematically by line $t1$, FIG. 10. The moment the end 5c of the rod pushes back the pushbutton of contactor "c"—an action shown schematically by wire $t2$—this contactor closes the circuit $c1$ which stops the motor 45 and withdraws the rod from jack 46 controlling the raising of support 47. Furthermore, a circuit $c2$ activates motors 24 bringing about the descent of the supports 23 of the rollers 22.

When the rollers 22 descend, rod 5a engages support plates 25 of the horizontal screw conveyor devices which have been moved to the level of the rows of carrier finger-bars 26 on which the rod is to be aligned. As hereinbefore explained, the teeth 30 of shaft 27 are turned to the horizontal position so that only the helicoidal surfaces of the conveyors 15 separate the rods from each other.

Since each of the assemblies, made up of posts 7 and 8, involve identical control members, we note that we can also control the performance of the rod loading and unloading operations with the help of a single assembly of control circuits, activating, in parallel, the motors, such as 20 and 24; or on the other hand, we can control, in series, the similar members of the two assemblies, with the end-of-run control contactors being duplicated.

In the version chosen here, we assume that there is only one set of contactors, the motor mechanism such as 20, 24 or 13b, belonging to each carrier assembly, being controlled in parallel.

Thus, with motors 24 having been activated by circuit $c2$, the cases 23, bearing the rollers 22, descend to a point until, contactor "d" is activated by a case 23. This control is shown schematically in FIG. 10 by line $g1$. The contactor "d" establishes the circuit $d1$ activating the rotation mechanism 14 of screw 15 and the stoppage of motor 24. The mechanism permitting the movement of screw 15, so as to accomplish one turn, has been shown schematically in FIG. 9.

The movement inversion mechanism 53 is so adjusted as to bring about the rotation of screw 15 in a direction causing the rods to move in a direction going from post 7 to post 8, in FIG. 6, and all rods, guided by the helicoidal surfaces of the screw 15, are simultaneously moved along in the direction indicated, over a distance equal to the length of the thread of the screw, the rods here remaining parallel to each other. Rod 5 which has been placed as explained above on the first thread of screw 15, then, at the end of the movement, occupies the place that was occupied earlier by rod 4 in the position shown in FIGS. 1 and 6.

We note furthermore that each time jack 15 controlling the rotation of the screw 15 by one turn, is activated, its rod, bearing the rack 51, brings about the registration of a supplementary unit in the counter, shown schematically by 49, in FIGS. 9 and 10. This registration of one unit has been illustrated schematically by line $v1$. The counter 49 thus enables us to count the number of rods introduced into one row. If the maximum number of rods, which one can introduce on a finger-bar 26, is equal to $n$, then counter 49 is selected so as to count up to $n$ and it will activate the transmission of a signal the movement that number has been reached. This signal is transmitted on circuit $n1$, FIG. 10, which brings about the activation of contactor "1" which functions to activate, by means of circuit $l1$, the jacks 20 and 50. The jack 50, FIG. 9 has the function of unlocking a latch, such as 62, for example, keeping the support cases 13b in position on the posts 7 and 8 during the loading operations. It thus becomes possible to move the assembly of screw 15 from one row to the next, either upward or downward, depending upon whether the movement inversion member 58, FIG. 8, was activated to invert or not to invert the movement transmitted by pinion 57 due to the action of jack 20. When the rod of jack 20 engages contactor "a" in action illustrated schematically by w1, the circuit m1, FIG. 10, activates with withdrawal of the rods of jacks 20 and 50, the latter locking the support cases 13a, 13b of the screws 15 in their new positions. The return of the rod of jack 20 to its initial position is accomplished without bringing about the rotation of shaft 21.

It is clear that the performance of the above operations can take place only if counter 49, FIG. 9, registers the value n, that is to say, if the last rod has been introduced on the selected horizontal row, which implies that screw 15 has performed one complete rotation.

In the general case, the end of the rotation of one turn of the screw 15, which occurs when the end of the rack 51 reaches the contactor "c" FIG. 9 involves the establishment of circuits e1 and e2. The activation of the contactor c has been shown schematically at v2. The circuit e2 activates the return of the rod of jack 14 to its initial position without bringing about the rotation of screw 15. The circuit e1 activates the motor 24, which brings about the rise of rollers 22. This rise is accomplished without a pick up of the rod, since rod 5 has been moved horizontally on the carrying finger-bars. We note that, in order to permit the easy passage of the supports 23 of rollers 22 between the free end of the carrier finger-bars, such as 26 and post 7, while still permitting the transfer, on finger-bars 26, of the rod carried by rollers 22 after a single rotation turn of screw 15, the helicoidal surfaces of the screw, which are on the level of the track of rollers 22, have a thread greater than the constant thread of screw 15 in the entire portion thereof that is opposite the finger-bars 26.

The following rods are loaded in an identical manner. We have seen that when a row is filled, the horizontal conveyors move on the loading level of the row of finger-bars immediately below.

When we want to proceed to an automatic succession of rod withdrawals, it suffices to activate the movement inversion devices 53 and 58, FIGS. 9 and 8, so that the rotation of screw 15 will take place from 8 toward 7 and so that the displacement of their supports 13a and 13b takes place from the bottom to the top.

Let us assume, for example, that devices 53 and 58 have been activated, that a rod 5a has been lifted up by rollers 22, and tips finger-bar 61 of contactor "a" from bottom to top. This operation, schematically indicated by t3, once again brings about the establishment of circuit a1, controlling the rotation of motors 45. An inverter enables us to activate the rotation of motors 45 in the direction opposite to the one used for the rod loading operations, so that rod 5a is directed toward stop "b" with jack 46 being controlled by circuit a1, as previously described. The action of the end 5b of rod 5a on stop "b" is shown by line t4. The contactor "b" then, by means of circuit b1, stops the motors 45 and brings about the withdrawal of the rod of the jack 46. The bar 5a can then be withdrawn and thus finally releases finger-bar 61 which returns to its horizontal position. Furthermore, circuit a2 brings about the descent of the supports 23 by turning on motors 24. At the end of the movement, contactor "d" brings about, by means of d1, the stoppage of motor 24 and the activation of the rotation of screw 51 by jack 14. The operations described on the occasion of the description of the loading operations are thus repeated for the rod unloading operations, but this time the direction of movement is inverted because of the prior activation of devices 53 and 58.

It is clear that we would not go beyond the framework of this invention if we were to replace the manual control for the inversion of the direction of the vertical movements of the horizontal conveyors as well as the direction of rotation of the screws 15 and the motors 45 by automatic controls simultaneously accomplishing the inversion of direction each time we want to pass from a loading operation to an unloading operation and vice versa.

We claim:

1. Apparatus for the horizontal stacking of rods in which each rod is supported horizontally by at least two carrying finger-bars in the same horizontal plane, each belonging to a distinct series of horizontal finger-bars that are aligned vertically and spaced evenly, each finger-bar of one series having a free end and a fixed end, said apparatus comprising means for the reception of a rod in the horizontal position and for the vertical movement of said rod to the desired level adjacent the free ends of a group of finger-bars situated in the same horizontal plane, at least two horizontal screw conveyors disposed in the same horizontal plane and having the same thread and orientation, means for rotating said screw conveyors in a synchronized fashion, turn-by-turn, and means for moving said conveyors in a synchronized fashion, up to a predetermined level adjacent said desired level, the length of said screw conveyors being greater than that of said finger-bars such that any rod, displaced vertically by said vertical movement means, is engaged by said conveyors and moved laterally onto said group of finger-bars.

2. Apparatus for the horizontal stacking of rods as in claim 1, wherein each end of each shaft of said screw conveyors is mounted in a vertically movable support, one of said supports being mounted on a post situated beyond the free ends of said carrier finger-bars for supporting said rods, said one support comprising a horizontal support plate on such a level that, when the upper surface of the plate is on the level of the upper surface of said group of finger-bars, the rod, engaged by said screw conveyors during its movement by said vertical movement means, penetrates between two portions of neighboring helocoidal surfaces on said conveyors and engages said support plates.

3. Apparatus for the horizontal stacking of rods as in claim 1, wherein the portion of each said horizontal screw conveyors, extending beyond the free ends of said carrying finger-bars, has a thread whose length is greater than the rest of the thread of each screw conveyor.

4. Horizontal rod stacking apparatus as in claim 1, further comprising combs having a longitudinal portion and a plurality of equally spaced teeth extending transversely therefrom, said longitudinal portion having an axis parallel to said finger-bars and being pivotable about said axis so as to assume two extreme positions, said teeth being vertical in one of said positions and horizontal in the other position, the interval between the axes of two consecutive teeth being equal to the thread of the screw of the horizontal conveyors.

5. Horizontal rod stacking apparatus as in claim 4, further comprising means for retaining said combs in said one and said other position, and means carried by said horizontal screw conveyors to effect the movement of said combs from their vertical position to their horizontal position during the rising movement of said horizontal conveyors, and from the horizontal position to their vertical position during the descending movement of said conveyors.

6. Horizontal rod stacking apparatus as in claim 1, wherein said vertical rod movement means comprises at least two rollers which can be displaced from a low position, whose level is below the lowest carrier finger-bar group to a high position, above the highest carrying finger-bar group, at least one of said rollers cooperating in its high position with a train of moving rollers so as to serve as point of support for a rod sustained and being longitudinally displaced by said train of moving rollers.

7. Horizontal rod stacking apparatus as in claim 1, where the axis of each screw of said horizontal conveyors is supported by two cases sliding vertically on first and second posts, said first post supporting a series of carrying finger-bars at a fixed ends thereof, said second post carrying said means for the vertical movement of a rod to be lined up or to be extracted from the stacking system, and said case sliding on the first post includes the mechanism for the movement of said screw.

8. Horizontal rod stacking apparatus as in claim 7, wherein the carrying finger-bars comprise two lateral supports, two retaining springs, a comb having a shaft lodged on said supports and under said springs, said shaft having two flat parts cooperating with said springs so as to retain said comb in a horizontal position or in a vertical position, the end of each shaft adjacent said first post having a cam cooperating with stubs mounted on said case of the screw of the horizontal conveyor sliding on said first post, thereby serving to tip said comb from its vertical position to its horizontal position during the rise of said case to tip said comb in the opposite direction during the descent of said case.

9. Horizontal rod stacking apparatus in claim 6, further comprising a contactor activated by the position of a finger-bar situated in the path of movement of said vertical rod movement means, said finger-bar being tipped upward by any rod displaced upward by said vertical rod movement means and being tipped downward by any rod introduced on said vertical rod movement means, said contactor effecting in each one of said positions of its finger-bar, the application of said train of moving rollers upon the rod borne by said vertical movement means and the longitudinal movement of the rod in a direction for the disengagement of the rod outside the apparatus, said longitudinal movement being in opposite directions when said finger-bar is tipped upward or downward.

10. Horizontal rod stacking apparatus as in claim 9 further comprising a contactor in the path of longitudinal displacement of the rod supported by said vertical rod movement means, said contactor being activated by the end of said rod in the course of its longitudinal displacement and controlling the stoppage of said train of moving rollers and said vertical rod movement means.

11. Horizontal rod stacking apparatus as in claim 7 further comprising at the ends of the track of said vertical rod movement means, an upper contactor and a lower contactor, said lower contactor being activated every time said vertical rod movement means reaches its extreme low position and effecting the activation of the rotation, by one turn, of said horizontal screw conveyors and the stoppage of said vertical movement means said upper contactor effecting the transmission of a warning signal every time said vertical movement means reaches its upper position.

12. Horizontal rod stacking apparatus as in claim 7, wherein said mechanism for the activation of the rotation of each of said screws involves a motor device, a first and a second contactor and a counter device, said motor device effecting the registration of one unit in said counter each time it is activated and the activation of said first contactor each time said motor device is activated, said first contactor effecting the stoppage of said motor device after the rotation of each screw by one turn, said counter, during the registration of a predetermined number of units equal to the total number of rods capable of being introduced on the carrier finger-bars of the same horizontal row, activating said second contactor for the transmission of a warning signal.

13. Horizontal rod stacking apparatus as in claim 12, wherein said case having the mechanism for the movement of the screw, further includes a device for the locking of said case on its post, said second contactor, when it is activated by said counter causing the unlocking of said case locking device and activation of means for the displacement of said case to the next row of finger-bars.

14. Horizontal rod stacking apparatus as in claim 13, wherein said mechanism for the activation of the rotation of the screws and said means for the movement of said case each involves a mechanism for the inversion of the direction of the movement, thus causing the rods to progress toward the post supporting the carrier finger-bars and starting from the upper finger-bars toward the lower finger-bars during the introduction of rods, and causing the rods to progress in an inverse direction during their withdrawal.

* * * * *